United States Patent [19]

Fussell, Jr.

[11] 4,047,432
[45] Sept. 13, 1977

[54] BLUFF BODY FLOWMETER INCLUDING SHIELD-CHANNEL ARRANGEMENT

[75] Inventor: Theodore John Fussell, Jr., Bridgewater Township, Somerset County, N.J.

[73] Assignee: Neptune Eastech, Inc., Edison, N.J.

[21] Appl. No.: 713,887

[22] Filed: Aug. 12, 1976

[51] Int. Cl.² .............................................. G01F 1/32
[52] U.S. Cl. ............................................... 73/194 VS
[58] Field of Search .................................. 73/194 VS

[56] References Cited

U.S. PATENT DOCUMENTS

| 3,587,312 | 6/1971 | McMurtrie | 73/194 |
| 3,733,897 | 5/1973 | Herzl | 73/194 |

Primary Examiner—Herbert Goldstein
Attorney, Agent, or Firm—Frederick W. Padden

[57] ABSTRACT

A bluff body flowmeter, including a bluff body having a planar base surface portion disposed normal to fluid flow and a pair of converging downstream surfaces, is provided with a fluid flow channel in the base surface portion, a sensor in the channel and a shield which partially covers the channel and protects the sensor from impact damage. The shield and channel are mutually adapted so that fluid flow through the channel is substantially unidirectional. In one embodiment at least that portion of the shield which covers the channel is shorter than the channel thus forming a rectangular notch which acts as a fluid flow entrance port.

9 Claims, 2 Drawing Figures

DIRECTION OF FLUID FLOW

BLUFF BODY FLOWMETER INCLUDING SHIELD-CHANNEL ARRANGEMENT

BACKGROUND OF THE INVENTION

This invention relates to flowmetering equipment and, more particularly, to improved bluff body flowmeters in which a sensor is located in an upstream surface of the body.

The natural phenomenon of vortex shedding has for a number of years been exploited in the flowmetering industry in order to measure flowrate. A simple count of vortices shed is all that is required to establish total flow. However, until recently attempts to design a vortex shedding flowmeter were unsuccessful because the shedding action was generally neither strong enough nor regular enough over flowrate ranges of industrial interest to permit reliable detection. Even in cases where the frequency was detectable, its relationship to flowrate was nonlinear and thus required complex and expensive electronic detection equipment.

This situation changed dramatically, however, with the advent of the Rodely bluff body flowmeter. As described in U.S. Pat. No. 3,572,117, assigned to the assignee hereof, there is a family of Rodely bluff body configurations which produce strong vortex shedding, free of intermittency, in fluid flowing through a conduit. In a preferred embodiment the Rodely bluff body has a planar base surface normal to the direction of fluid flow and a pair of converging downstream surfaces. To achieve nonintermittency the dimensions of the bluff body relative to the diameter of the conduit satisfy certain prescribed conditions set forth at column 3, lines 55-58.

Although the Rodely patent discloses a flowmeter in which the sensor is located external to and downstream of the bluff body, an important improvement incorporates an upstream sensor located in the base surface of the bluff body. One such configuration using a pair of such sensors in a differential detection scheme is taught by C. L. McMurtrie in U.S. Pat. No. 3,587,312 also assigned to the assignee hereof. Locating the sensor in the upstream base surface yields high signal-to-noise ratios because the sensor is not adversely affected by the turbulent wake of the bluff body.

One disadvantage, however, of sensing on the upstream base surface is the vulnerability of the sensor to damage caused by the impact of particles in the flowing fluid stream. Another disadvantage is the need to use an expensive matched pair of sensors and attendant electronics (filters, compensation, etc.) in order to obtain common mode rejection of in-phase fluid mechanical noise as in the McMurtrie flowmeter above.

SUMMARY OF THE INVENTION

It is a broad object of my invention to measure the flowrate of fluid in a conduit.

It is another object of my invention to measure the flowrate by means of a bluff body to generate vortex shedding in the fluid.

It is still another object of my invention to measure the flowrate by means of a sensor located in an upstream surface of a bluff body.

It is yet another object of my invention to perform such detection with a single sensor and thereby with less complex and expensive electronic detection equipment.

It is also an object of my invention to perform such detection in a relatively dirty fluid.

These and other objects are met in accordance with an illustrative embodiment of my invention, a bluff body flowmeter in which the bluff body (of the Rodely type) includes a planar bluff body base portion disposed normal to fluid flow in a conduit and a pair of converging downstream surfaces characterized in that a channel is formed in the base surface, a sensor is located in the channel and a shield partially covers the channel and protects the sensor from the impact of dirt particles in the fluid. An important feature of my invention resides in designing the shield and channel so that fluid flow through the channel is substantially unidirectional. Unidirectional flow insures good signal-to-noise ratios, allows the use of a single sensor and thereby results in substantial cost savings. In a preferred geometrical arrangement for realizing these advantages, at least that portion of the shield which covers the channel is shorter than the channel itself thus forming a rectangular notch which acts as a fluid flow entrance port.

Fluid approaching the bluff body flows over the base surface and continues downstream forming vortices in the usual manner. But, a small portion of the approach flow enters the entrance port, flows through the channel and across the sensor. The flow in the channel is analogous to d.c. electric current flow. Vortex shedding behind the bluff body causes the d.c. flow to pulsate thus dynamically exciting the sensor at one-half the frequency of vortex shedding. That is, for each pair of vortices shed, one electrical pulse is generated. This is different from a central sensor arrangement where for each pair of vortices shed two electrical pulses are generated.

BRIEF DESCRIPTION OF THE DRAWING

These and other objects of my invention, together with its various features and advantages, can be readily understood from the following more detailed description taken in conjunction with the accompanying drawing in which.

DETAILED DESCRIPTION

Figure 1:
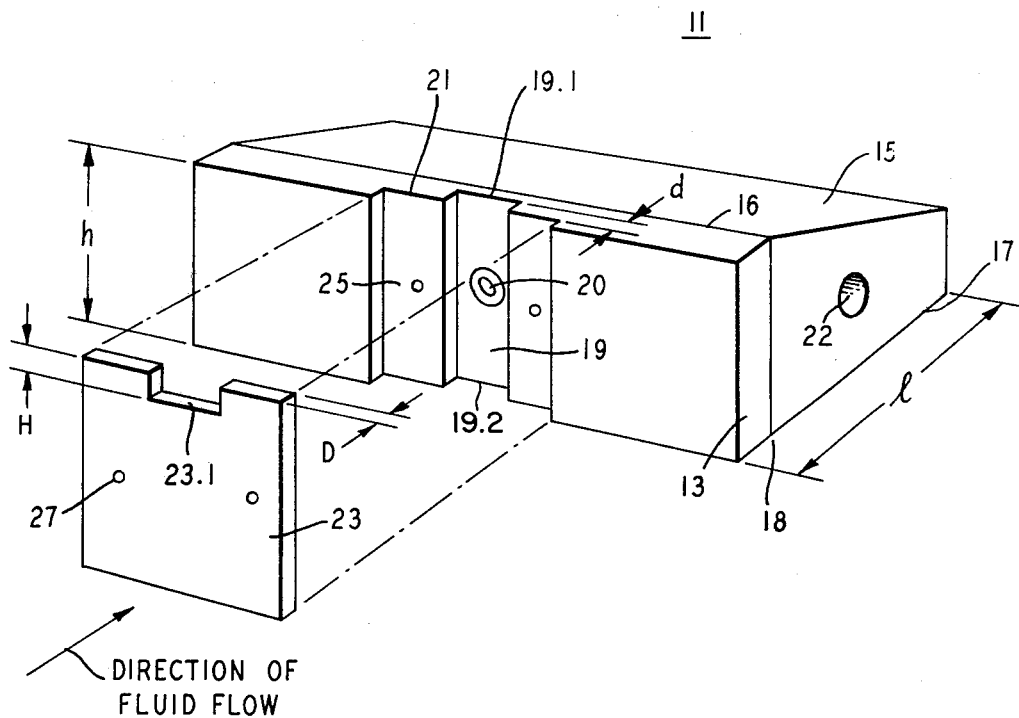
FIG. 1 is an exploded pictorial view of a bluff body in accordance with an illustrative embodiment of my invention.

With reference now to FIG. 1, there is shown in accordance with one embodiment of my invention a bluff body 11 which is typically mounted along a diameter of a conduit (not shown) and between the walls thereof by means of end base members omitted for clarity. The bluff body 11 comprises an elongated planar base surface portion 13 disposed preferably normal to the direction of fluid flow in the conduit, and a pair of converging downstream surfaces 15 and 17 which meet the base portion 13 along a pair of edges 16 and 18 where boundary layers of the fluid separate from the body (i.e., vortex shedding starts).

The cross section of bluff body 11, therefore, is substantially triangular. In order to produce vortex shedding free of intermittency the dimensions of the bluff body preferably satisfy the Rodely criteria: the ratio of the axial length $l$ to the height $h$ of the base is advantageously between 1 and 2, and the ratio of the height $h$ to inner diameter of the conduit is advantageously between 0.15 and 0.4.

In order to detect vortex shedding, the bluff body 11 is provided with a fluid flow channel 19 formed in the base surface portion 13 and a sensor 20 located in the channel 19. Illustratively, sensor 20 is a thermal sensor although other types (e.g., pressure sensitive) can also be used. Electrical access to the sensor is made through the interior of the bluff body via an elongated aperture 22 which extends parallel to the long axis of the body. Preferably the channel 19 is oriented so that it traverses the shorter dimension (the height) of the base surface and is perpendicular to the long axis of the bluff body 11.

In addition, the base surface portion 13 is provided with a recess 21 adapted to receive a shield 23 which is secured to the bluff body via rivets or other suitable means (not shown) inserted through holes 25 and 27 in the base and shield, respectively. With the shield so secured, a pair of fluid ports 19.1 and 19.2 are formed at opposite ends of channel 19. In order to insure that fluid flow through the channel is unidirectional, however, the portion of the shield 23 which covers channel 19 is made shorter than the length of the channel. In the embodiment shown, this end is achieved by cutting a rectangular notch 23.1 in the top of shield 23 so that it is in registration with the channel 19. In this configuration, the port 19.1 is an entrance port and of course port 19.2 is an exit port. Note that the notch could alternatively be formed in the bottom of the shield and could take on other geometric shapes (e.g., semi-circular) but notches in both the top and bottom would not be desirable because two notches would yield bi-directional, not unidirectional fluid flow in channel 19.

In operation, a portion of the approaching fluid flow enters entrance port 19.1, flows through channel 19 and across sensor 20. Vortex shedding downstream of the bluff body produces pressure fluctuations causing the unidirectional flow in channel 19 to pulsate, thus dynamically exciting sensor 20 at one-half the vortex shedding frequency.

The shield serves not only to define entrance port 19.1 by means of notch 23.1 but also to protect the sensor from possible damage by the impact of dirt particles in the fluid stream. In this regard, the size of the channel 19, in particular its depth $d$, should be large enough to prevent dirt from building up and thereby blocking fluid flow in the channel. However, it should be carefully noted that as the depth $d$ of the channel is changed then the height D of the notch should also change (in the same direction) in order to maintain optimum signal-to-noise performance.

This embodiment of my invention should be contrasted with a similar configuration in which the shield has an aperture between a pair of sensors instead of a notch at one end. Experiments I performed with both types of bluff body flowmeters demonstrated that my invention has an improved signal-to-noise ratio and a signal amplitude five times greater for a like amount of electrical energy supplied to the sensors and indeed has the best performance to date for flowmeters of this type.

Figure 2:
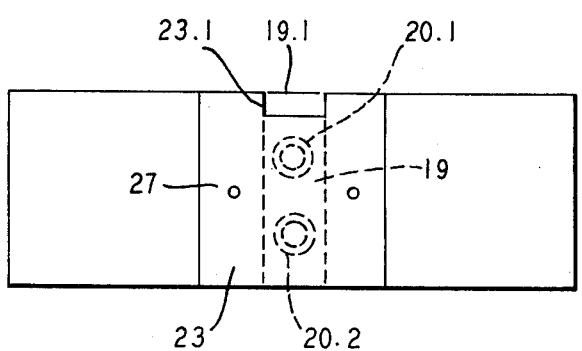
FIG. 2 is a front view of a bluff body in accordance with another embodiment of my invention incorporating both an operating sensor and a spare sensor to facilitate fluid serviceability.

It is to be understood that the above-described arrangements are merely illustrative of the many possible specific embodiments which can be devised to represent application of the principles of my invention. Numerous and varied other arrangements can be devised in accordance with these principles by those of ordinary skill in the art without departing from the spirit and scope of my invention. In particular, another embodiment of my invention shown in FIG. 2 incorporates a pair of sensors in channel 19, but only one, sensor 20.2 positioned farthest from entrance port 19.1, is operative at a time. The other sensor 20.1 is a spare which facilitates field servicing. That is, should active sensor 20.2 fail, then service personnel can readily connect spare sensor 20.1 to the electronic processing equipment. When the spare sensor 20.1 is used, however, it is advantageous to invert shield 23 so that notch 23.1 is always located farthest from the sensor being used. In this manner good signal quality is insured.

What is claimed is:

1. For use in measuring the flowrate of fluid in a conduit, a bluff body comprising
    a planar base surface portion disposed substantially normal to the direction of fluid flow and effective to produce vortex shedding in said fluid, characterized in that
    a fluid flow channel extends from one side of said base portion to the opposite side thereof,
    a sensor is located in said channel,
    a shield is disposed over said channel and said sensor, and
    at least that portion of said shield which covers said channel is shorter than the length of said channel so that fluid flow through said channel is unidirectional.

2. The bluff body of claim 1 further characterized in that
    said shield has a notch at one end thereof in substantial registration with said channel, thereby forming an entrance port through which fluid flow enters unidirectionally.

3. The bluff body of claim 2 further characterized in that said notch is rectangular.

4. The bluff body of claim 3 wherein the depth of said channel and the height of said notch are mutually adapted to produce high signal-to-noise ratio performance.

5. The bluff body of claim 1 further characterized in that
    a recess is formed in said base portion to receive said shield, and
    said channel is formed in said recess.

6. The bluff body of claim 1 further characterized in that a pair of sensors are located in said channel only one of which is operational at a time.

7. For use in measuring the flowrate of fluid in a conduit, a bluff body comprising
    an elongated planar base surface portion disposed substantially normal to the direction of fluid flow and having its long dimension extending along a diameter of said conduit and between the walls thereof,
    a pair of converging surfaces extending downstream from said base surface portion and meeting said base portion along a pair of edges,
    said base portion and converging surfaces forming a substantially triangular cross section of said body and being mutually adapted so that the boundary layers of said fluid separate from said body at said edges and so that vortex shedding is free from intermittency, and characterized in that
    a recess is formed in said base portion,
    a fluid flow channel is formed in said recess and extends from one side of said base portion to an opposite side thereof, a sensor is located in said channel, a shield is disposed in said recess over said channel and said sensor, said shield has a rectangular notch at one end thereof in substantial registration with said channel, thereby forming an entrance port at said one end through fluid flows unidirectionally and the depth of said channel and the height of said notch are mutually adapted to produce high signal-to-noise ratio performance.

8. The bluff body of claim 7 further characterized in that a pair of sensors are located in said channel only one of which is operational at a time.

9. The bluff body of claim 7 further characterized in that said channel is rectangular and extends normal to said elongated axis of said base portion.

* * * * *